United States Patent
Colombo et al.

(10) Patent No.: US 11,337,424 B2
(45) Date of Patent: May 24, 2022

(54) FUNGICIDAL COMPOUNDS AND MIXTURES FOR FUNGAL CONTROL IN CEREALS

(71) Applicant: Corteva Agriscience LLC, Indianapolis, IN (US)

(72) Inventors: Romain Colombo, Verson (FR); Akos Biro, Szolnok (HU); Courtney Gallup, Indianapolis, IN (US); Iuliia Kovalova, Warwick (GB)

(73) Assignee: Corteva Agriscience LLC, Indianapolis, IN (US)

(*) Notice: Subject to any disclaimer, the term of this patent is extended or adjusted under 35 U.S.C. 154(b) by 325 days.

(21) Appl. No.: 16/462,848

(22) PCT Filed: Nov. 22, 2017

(86) PCT No.: PCT/US2017/062942
§ 371 (c)(1),
(2) Date: May 21, 2019

(87) PCT Pub. No.: WO2018/098224
PCT Pub. Date: May 31, 2018

(65) Prior Publication Data
US 2021/0282400 A1    Sep. 16, 2021

Related U.S. Application Data

(60) Provisional application No. 62/425,524, filed on Nov. 22, 2016.

(51) Int. Cl.
*A01N 43/653*     (2006.01)
*A01N 43/40*     (2006.01)

(52) U.S. Cl.
CPC .......... *A01N 43/653* (2013.01); *A01N 43/40* (2013.01)

(58) Field of Classification Search
None
See application file for complete search history.

(56) References Cited

U.S. PATENT DOCUMENTS 8,748,461 B2    6/2014 Hoekstra et al.

FOREIGN PATENT DOCUMENTS

| EP | 2848616 A1 | 3/2015 |
| WO | 199307139 A1 | 4/1993 |
| WO | 2010146113 A1 | 12/2010 |
| WO | 2014193974 A1 | 12/2014 |

OTHER PUBLICATIONS

International Search Report for PCT/US2017/062942, ISA/KR, dated Mar. 15, 2018, all pages.
Written Opinion for PCT/US2017/062942, ISA/KR, dated Mar. 15, 2018, all pages.

*Primary Examiner* — Po-Chih Chen

(57) ABSTRACT

A fungicidal composition containing a fungicidally effective amount of a compound of Formula I, 4-((6-(2-(2,4-difluorophenyl)-1,1-difluoro-2-hydroxy-3-(5-thioxo-4,5-dihydro-1H-1,2,4-triazol-1-yl)propyl)pyridin-3- yl)oxy)benzonitrile for use on fungal diseases of cereals. Additionally, this disclosure concerns a fungicidal composition containing (a) a compound of Formula I, 4-((6-(2-(2,4-difluorophenyl)-1, 1-difluoro-2-hydroxy-3-(5-thioxo-4,5-dihydro-1H-1,2,4-triazol-1l-yl)propyl)pyridin-3-yl)oxy)benzonitrile and (b) fenpicoxamid, for control of fungal diseases of cereals.

13 Claims, No Drawings

FUNGICIDAL COMPOUNDS AND MIXTURES FOR FUNGAL CONTROL IN CEREALS

CROSS-REFERENCE TO RELATED APPLICATION(S)

The present application is a U.S. National Phase Patent Application based on International Application No. PCT/US2017/062942 filed Nov. 22, 2017, which claims the benefit of U.S. provisional patent application, U.S. Ser. No. 62/425,524, filed Nov. 22, 2016, the entire contents of which are incorporated herein by reference.

FIELD OF THE INVENTION

This disclosure concerns a fungicidal composition containing the compound of Formula I, 4-((6-(2-(2,4-difluorophenyl)-1,1-difluoro-2-hydroxy-3-(5-thioxo-4,5-dihydro-1H-1,2,4-triazol-1-yl)propyl)pyridin-3-yl)oxy)benzonitrile for fungal control in cereals. Additionally, this disclosure concerns a fungicidal composition containing (a) the compound of Formula I, 4-((6-(2-(2,4-difluorophenyl)-1,1-difluoro-2-hydroxy-3-(5-thioxo-4,5-dihydro-1H-1,2,4-triazol-1-yl)propyl)pyridin-3-yl)oxy)benzonitrile and (b) fenpicoxamid, for control of fungal diseases of cereals.

BACKGROUND AND SUMMARY

Fungicides are compounds, of natural or synthetic origin, which act to protect plants against damage caused by fungi. Current methods of agriculture rely heavily on the use of fungicides. In fact, some crops cannot be grown usefully without the use of fungicides. Using fungicides allows a grower to increase the yield and the quality of the crop, and consequently, increase the value of the crop. In most situations, the increase in value of the crop is worth at least three times the cost of the use of the fungicide.

However, no one fungicide is useful in all situations and repeated usage of a single fungicide frequently leads to the development of resistance to that and related fungicides. Consequently, research is being conducted to produce fungicides and combinations of fungicides that are safer, that have better performance, that require lower dosages, that are easier to use, and that cost less.

It is an object of this disclosure to provide compositions comprising fungicidal compounds. It is a further object of this disclosure to provide processes that use these compositions. The compositions are capable of preventing or curing, or both, fungal diseases of cereals, including, but not limited to, leaf blotch of wheat, caused by *Zymoseptoria tritici* (SEPTTR); brown rust of wheat, caused by *Puccinia recondita* (PUCCRT); and yellow rust of wheat, caused by *Puccinia striiformis* (PUCCST). In accordance with this disclosure, compositions are provided along with methods for their use.

DETAILED DESCRIPTION

The present disclosure concerns a fungicidal composition comprising a fungicidally effective amount of the compound of Formula I, 4-((6-(2-(2,4-difluorophenyl)-1,1-difluoro-2-hydroxy-3-(5-thioxo-4,5-dihydro-1H-1,2,4-triazol-1-yl)propyl)pyridin-3-yl)oxy)benzonitrile for use on fungal diseases of cereals. Additionally, this disclosure concerns a fungicidal composition containing (a) the compound of Formula I, 4-((6-(2-(2,4-difluorophenyl)-1,1-difluoro-2-hydroxy-3-(5-thioxo-4,5-dihydro-1H-1,2,4-triazol-1-yl)propyl)pyridin-3-yl)oxy)benzonitrile and (b) fenpicoxamid, for control of fungal diseases of cereals.

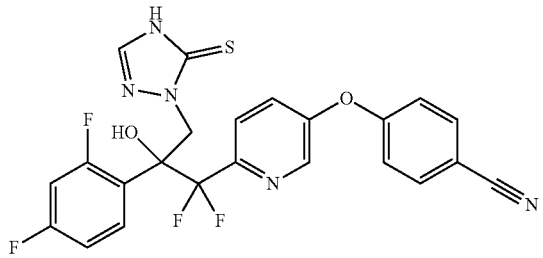

Formula I

As used herein, fenpicoxamid is the common name for (3S,6S,7R,8R)-8-benzyl-3-(3-((isobutyryloxy)methoxy)-4-methoxypicolinamido)-6-methyl-4,9-dioxo-1,5-dioxonan-7-yl isobutyrate, and possesses the following structure:

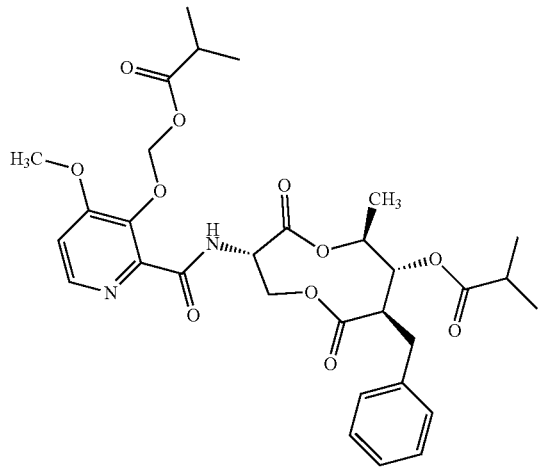 [SMILES: COc1ccnc(C(=O)N[C@H]2COC(=O)[C@H](Cc3ccccc3)[C@@H](OC(=O)C(C)C)[C@H](C)OC2=O)c1OCOC(=O)C(C)C]

Fenpicoxamid and its fungicidal action and possible uses thereof can be found in WO 2003/035617. Fenpicoxamid provides control of a variety of pathogens in economically important crops including barley leaf scald (*Rhynchosporium secalis*); spot blotch of barley (*Cochliobolus sativum*); wheat brown rust (*Puccinia triticina*); stripe rust of wheat (*Puccinia striiformis*); leaf blotch of wheat (*Zymoseptoria tritici*); glume blotch of wheat (*Parastagonospora nodorum*); wheat powdery mildew (*Blumeria graminis* f. sp. *tritici*); eye spot of wheat (*Pseudocercosporella herpotrichoides*); leaf spot of sugar beets (*Cercospora beticola*); leaf spot of peanut (*Mycosphaerella arachidis*); cucumber anthracnose (*Colletotrichum lagenarium*); apple scab (*Venturia inaequalis*); rice blast (*Pyricularia oryzae*); *Sclerotinia* white mold (*Sclerotinia sclerotiorum*); brown rot of stone fruits (*Monilinia fructicola*) and black sigatoka disease of banana (*Mycosphaerella fijiensis*).

The components of the composition of the present disclosure can be applied either separately or as part of a multipart fungicidal system.

The mixture of the present disclosure can be applied in conjunction with one or more other fungicides to control a wider variety of undesirable diseases. When used in conjunction with other fungicide(s), the presently claimed compounds may be formulated with the other fungicide(s), tank mixed with the other fungicide(s) or applied sequentially with the other fungicide(s). Such other fungicides may include 2-(thiocyanatomethylthio)-benzothiazole, 2-phenylphenol, 8-hydroxyquinoline sulfate, ametoctradin, amisulbrom, antimycin, *Ampelomyces quisqualis*, azaconazole, azoxystrobin, *Bacillus subtilis, Bacillus subtilis* strain QST713, benalaxyl, benomyl, benthiavalicarb-isopropyl, benzovindiflupyr benzylaminobenzene-sulfonate (BABS) salt, bicarbonates, biphenyl, bismerthiazol, bitertanol, bixafen, blasticidin-S, borax, Bordeaux mixture, boscalid, bromuconazole, bupirimate, calcium polysulfide, captafol, captan, carbendazim, carboxin, carpropamid, carvone, chlazafenone, chloroneb, chlorothalonil, chlozolinate, *Coniothyrium minitans*, copper hydroxide, copper octanoate, copper oxychloride, copper sulfate, copper sulfate (tribasic), cuprous oxide, cyazofamid, cyflufenamid, cymoxanil, cyproconazole, cyprodinil, dazomet, debacarb, diammonium ethylenebis-(dithiocarbamate), dichlofluanid, dichlorophen, diclocymet, diclomezine, dichloran, diethofencarb, difenoconazole, difenzoquat ion, diflumetorim, dimethomorph, dimoxystrobin, diniconazole, diniconazole-M, dinobuton, dinocap, diphenylamine, dithianon, dodemorph, dodemorph acetate, dodine, dodine free base, edifenphos, enestrobin, enestroburin, epoxiconazole, ethaboxam, ethoxyquin, etridiazole, famoxadone, fenamidone, fenarimol, fenbuconazole, fenfuram, fenhexamid, fenoxanil, fenpiclonil, fenpropidin, fenpropimorph, fenpyrazamine, fentin, fentin acetate, fentin hydroxide, ferbam, ferimzone, fluazinam, fludioxonil, flumorph, fluopicolide, fluopyram, fluoroimide, fluoxastrobin, fluquinconazole, flusilazole, flusulfamide, flutianil, flutolanil, flutriafol, fluxapyroxad, folpet, formaldehyde, fosetyl, fosetyl-aluminium, fuberidazole, furalaxyl, furametpyr, guazatine, guazatine acetates, GY-81, hexachlorobenzene, hexaconazole, hymexazol, imazalil, imazalil sulfate, imibenconazole, iminoctadine, iminoctadine triacetate, iminoctadine tris(albesilate), iodocarb, ipconazole, ipfenpyrazolone, iprobenfos, iprodione, iprovalicarb, isoprothiolane, isopyrazam, isotianil, kasugamycin, kasugamycin hydrochloride hydrate, kresoximmethyl, laminarin, mancopper, mancozeb, mandipropamid, maneb, mefenoxam, mepanipyrim, mepronil, meptyl-dinocap, mercuric chloride, mercuric oxide, mercurous chloride, metalaxyl, metalaxyl-M, metam, metam-ammonium, metam-potassium, metam-sodium, metconazole, methasulfocarb, methyl iodide, methyl isothiocyanate, metiram, metominostrobin, metrafenone, mildiomycin, myclobutanil, nabam, nitrothal-isopropyl, nuarimol, octhilinone, ofurace, oleic acid (fatty acids), orysastrobin, oxadixyl, oxathiopiprolin, oxine-copper, oxpoconazole fumarate, oxycarboxin, pefurazoate, penconazole, pencycuron, penflufen, pentachlorophenol, pentachlorophenyl laurate, penthiopyrad, phenylmercury acetate, phosphonic acid, phthalide, picoxystrobin, polyoxin B, polyoxins, polyoxorim, potassium bicarbonate, potassium hydroxyquinoline sulfate, probenazole, prochloraz, procymidone, propamocarb, propamocarb hydrochloride, propiconazole, propineb, proquinazid, prothioconazole, pydiflumetofen, pyraclostrobin, pyrametostrobin, pyraoxystrobin, pyrazifumid, pyrazophos, pyribencarb, pyributicarb, pyrifenox, pyrimethanil, pyriofenone, pyroquilon, quinoclamine, quinoxyfen, quintozene, *Reynoutria sachalinensis* extract, sedaxane, silthiofam, simeconazole, sodium 2-phenylphenoxide, sodium bicarbonate, sodium pentachlorophenoxide, spiroxamine, sulfur, SYP-Z048, tar oils, tebuconazole, tebufloquin, tecnazene, tetraconazole, thiabendazole, thifluzamide, thiophanate-methyl, thiram, tiadinil, tolclofos-methyl, tolylfluanid, triadimefon, triadimenol, triazoxide, tricyclazole, tridemorph, trifloxystrobin, triflumizole, triforine, triticonazole, validamycin, valifenalate, valiphenal, vinclozolin, zineb, ziram, zoxamide, *Candida oleophila, Fusarium oxysporum, Gliocladium* spp., *Phlebiopsis gigantea, Streptomyces griseoviridis, Trichoderma* spp., (RS)-N-(3,5-dichlorophenyl)-2-(methoxymethyl)-succinimide, 1,2-dichloropropane, 1,3-dichloro-1,1,3,3-tetrafluoroacetone hydrate, 1-chloro-2,4-dinitronaphthalene, 1-chloro-2-nitropropane, 2-(2-heptadecyl-2-imidazolin-1-yl)ethanol, 2,3-dihydro-5-phenyl-1,4-dithiine 1,1,4,4-tetraoxide, 2-methoxyethylmercury acetate, 2-methoxyethylmercury chloride, 2-methoxyethylmercury silicate, 3-(4-chlorophenyl)-5-methylrhodanine, 4-(2-nitroprop-1-enyl)phenyl thiocyanateme, ampropylfos, anilazine, azithiram, barium polysulfide, Bayer 32394, benodanil, benquinox, bentaluron, benzamacril; benzamacril-isobutyl, benzamorf, binapacryl, bis(methylmercury) sulfate, bis(tributyltin) oxide, buthiobate, cadmium calcium copper zinc chromate sulfate, carbamorph, CECA, chlobenthiazone, chloraniformethan, chlorfenazole, chlorquinox, climbazole, copper bis(3-phenylsalicylate), copper zinc chromate, coumoxystrobin, cufraneb, cupric hydrazinium sulfate, cuprobam, cyclafuramid, cypendazole, cyprofuram, decafentin, dichlobentiazox, dichlone, dichlozoline, diclobutrazol, dimethirimol, dinocton, dinosulfon, dinoterbon, dipymetitrone, dipyrithione, ditalimfos, dodicin, drazoxolon, EBP, enoxystrobin, ESBP, etaconazole, etem, ethirim, fenaminosulf, fenaminstrobin, fenapanil, fenitropan, fenpicoxamide, flufenoxystrobin, fluindapyr, fluotrimazole, furcarbanil, furconazole, furconazole-cis, furmecyclox, furophanate, glyodine, griseofulvin, halacrinate, Hercules 3944, hexylthiofos, ICIA0858, ipfentrifluconazole, isofetamide, isopamphos, isovaledione, mandestrobin, mebenil, mecarbinzid, mefentrifluconazole, metazoxolon, methfuroxam, methylmercury dicyandiamide, metsulfovax, milneb, mucochloric anhydride, myclozolin, N-3,5-dichlorophenyl-succinimide, N-3-nitrophenylitaconimide, natamycin, N-ethylmercurio-4-toluenesulfonanilide, nickel bis(dimethyldithiocarbamate), OCH, phenylmercury dimethyldithiocarbamate, phenylmercury nitrate, phosdiphen, prothiocarb; prothiocarb hydrochloride, pyracarbolid, pyridinitril, pyrisoxazole, pyroxychlor, pyroxyfur, quinacetol; quinacetol sulfate, quinazamid, quinconazole, quinofumelin, rabenzazole, salicylanilide, SSF-109, sultropen, tecoram, thiadifluor, thicyofen, thiochlorfenphim, thiophanate, thioquinox, tioxymid, triamiphos, triarimol, triazbutil, trichlamide, triclopyricarb, triflumezopyrim, urbacid, zarilamid, and any combinations thereof.

The compositions of the present disclosure are preferably applied in the form of a formulation comprising a composition of (a) a compound of Formula I and/or (b) fenpicoxamid, together with a phytologically acceptable carrier.

Concentrated formulations can be dispersed in water, or another liquid, for application, or formulations can be dustlike or granular, which can then be applied without further treatment. The formulations are prepared according to procedures which are conventional in the agricultural chemical art, but which are novel and important because of the presence therein of a composition.

The formulations that are applied most often are aqueous suspensions or emulsions. Either such water-soluble, water-suspendable, or emulsifiable formulations are solids, usually known as wettable powders, or liquids, usually known as emulsifiable concentrates, aqueous suspensions, or suspension concentrates. The present disclosure contemplates all vehicles by which the compositions can be formulated for delivery and use as a fungicide.

As will be readily appreciated, any material to which these compositions can be added may be used, provided they yield the desired utility without significant interference with the activity of these compositions as antifungal agents.

Wettable powders, which may be compacted to form water-dispersible granules, comprise an intimate mixture of the composition, a carrier and agriculturally acceptable surfactants. The concentration of the composition in the wettable powder is usually from about 10% to about 90% by weight, more preferably about 25% to about 75% by weight, based on the total weight of the formulation. In the preparation of wettable powder formulations, the composition can be compounded with any of the finely divided solids, such as prophyllite, talc, chalk, gypsum, Fuller's earth, bentonite, attapulgite, starch, casein, gluten, montmorillonite clays, diatomaceous earths, purified silicates or the like. In such operations, the finely divided carrier is ground or mixed with the composition in a volatile organic solvent. Effective surfactants, comprising from about 0.5% to about 10% by weight of the wettable powder, include sulfonated lignins, naphthalenesulfonates, alkylbenzenesulfonates, alkyl sulfates, and non-ionic surfactants, such as ethylene oxide adducts of alkyl phenols.

Emulsifiable concentrates of the composition comprise a convenient concentration, such as from about 10% to about 50% by weight, in a suitable liquid, based on the total weight of the emulsifiable concentrate formulation. The components of the compositions, jointly or separately, are dissolved in a carrier, which is either a water-miscible solvent or a mixture of water-immiscible organic solvents, and emulsifiers. The concentrates may be diluted with water and oil to form spray mixtures in the form of oil-in-water emulsions. Useful organic solvents include aromatics, especially the high-boiling naphthalenic and olefinic portions of petroleum such as heavy aromatic naphtha. Other organic solvents may also be used, such as, for example, terpenic solvents, including rosin derivatives, aliphatic ketones, such as cyclohexanone, and complex alcohols, such as 2-ethoxyethanol.

Emulsifiers which can be advantageously employed herein can be readily determined by those skilled in the art and include various nonionic, anionic, cationic and amphoteric emulsifiers, or a blend of two or more emulsifiers. Examples of nonionic emulsifiers useful in preparing the emulsifiable concentrates include the polyalkylene glycol ethers and condensation products of alkyl and aryl phenols, aliphatic alcohols, aliphatic amines or fatty acids with ethylene oxide, propylene oxides such as the ethoxylated alkyl phenols and carboxylic esters solubilized with the polyol or polyoxyalkylene. Cationic emulsifiers include quaternary ammonium compounds and fatty amine salts. Anionic emulsifiers include the oil-soluble salts (e.g., calcium) of alkylaryl sulfonic acids, oil-soluble salts or sulfated polyglycol ethers and appropriate salts of phosphated polyglycol ether.

Representative organic liquids which can be employed in preparing the emulsifiable concentrates of the present disclosure are the aromatic liquids such as xylene, propyl benzene fractions, or mixed naphthalene fractions, mineral oils, substituted aromatic organic liquids such as dioctyl phthalate, kerosene, dialkyl amides of various fatty acids, particularly the dimethyl amides of fatty glycols and glycol derivatives such as the n-butyl ether, ethyl ether or methyl ether of diethylene glycol, and the methyl ether of triethylene glycol. Mixtures of two or more organic liquids are also often suitably employed in the preparation of the emulsifiable concentrate. The preferred organic liquids are xylene, and propyl benzene fractions, with xylene being most preferred. The surface-active dispersing agents are usually employed in liquid formulations and in the amount of from 0.1 to 20 percent by weight of the combined weight of the dispersing agent with the compositions. The formulations can also contain other compatible additives, for example, plant growth regulators and other biologically active compounds used in agriculture.

Aqueous suspensions comprise suspensions of one or more water-insoluble compounds, dispersed in an aqueous vehicle at a concentration in the range from about 5% to about 70% by weight, based on the total weight of the aqueous suspension formulation. Suspensions are prepared by finely grinding the components of the combination either together or separately, and vigorously mixing the ground material into a vehicle comprised of water and surfactants chosen from the same types discussed above. Other ingredients, such as inorganic salts and synthetic or natural gums, may also be added to increase the density and viscosity of the aqueous vehicle. It is often most effective to grind and mix at the same time by preparing the aqueous mixture and homogenizing it in an implement such as a sand mill, ball mill, or piston-type homogenizer.

The composition may also be applied as a granular formulation, which is particularly useful for applications to the soil. Granular formulations usually contain from about 0.5% to about 10% by weight of the compounds, based on the total weight of the granular formulation, dispersed in a carrier which consists entirely or in large part of coarsely divided attapulgite, bentonite, diatomite, clay or a similar inexpensive substance. Such formulations are usually prepared by dissolving the composition in a suitable solvent and applying it to a granular carrier which has been preformed to the appropriate particle size, in the range of from about 0.5 to about 3 mm. Such formulations may also be prepared by making a dough or paste of the carrier and the composition, and crushing and drying to obtain the desired granular particle.

Dusts containing the composition are prepared simply by intimately mixing the composition in powdered form with a suitable dusty agricultural carrier, such as, for example, kaolin clay, ground volcanic rock, and the like. Dusts can suitably contain from about 1% to about 10% by weight of the composition/carrier combination.

The formulations may contain agriculturally acceptable adjuvant surfactants to enhance deposition, wetting and penetration of the composition onto the target crop and organism. These adjuvant surfactants may optionally be employed as a component of the formulation or as a tank mix. The amount of adjuvant surfactant will vary from 0.01 percent to 1.0 percent volume/volume (v/v) based on a spray-volume of water, preferably 0.05 to 0.5 percent. Suitable adjuvant surfactants include ethoxylated nonyl phenols, ethoxylated synthetic or natural alcohols, salts of the esters or sulfosuccinic acids, ethoxylated organosilicones, ethoxylated fatty amines and blends of surfactants with mineral or vegetable oils.

In certain instances, it would be beneficial for formulations of the current composition to be sprayed via an aerial application using aircraft or helicopters. The exact components of these aerial applications depends upon the crop being treated. Aerial applications for cereals utilize spray volumes preferably from 15 to 25 L/ha with standard spreading or penetrating type adjuvants such as non-ionic surfactants or crop oil concentrates, preferably from 0.05 to 15 percent, based on a spray volume of water. Aerial applications for fruit bearing crops, such as bananas, may utilize lower application volumes with higher adjuvant concentrations, preferably in the form of sticker adjuvants, such as fatty acids, latex, aliphatic alcohols, crop oils and inorganic oils. Typical spray volumes for fruit bearing crops are preferably from 15 to 30 L/ha with adjuvant concentrations reaching up to 30% based on a spray volume of water. A typical example might include, but not limited to, an application volume of 23 L/ha, with a 30% paraffin oil sticker adjuvant concentration (e.g. Spraytex CT).

The formulations may optionally include combinations that can comprise at least 1% by weight of one or more of the compositions with another pesticidal compound. Such additional pesticidal compounds may be fungicides, insecticides, nematocides, miticides, arthropodicides, bactericides or combinations thereof that are compatible with the compositions of the present disclosure in the medium selected for application, and not antagonistic to the activity of the present compounds. Accordingly, in such embodiments the other pesticidal compound is employed as a supplemental toxicant for the same or for a different pesticidal use. The pesticidal compound and the composition can generally be mixed together in a weight ratio of from 1:100 to 100:1.

The present disclosure includes within its scope methods for the control or prevention of fungal attack. These methods comprise applying to the locus of the fungus, or to a locus in which the infestation is to be prevented (for example applying to wheat or barley plants), a fungicidally effective amount of the composition. The composition is suitable for treatment of various plants at fungicidal levels, while exhibiting low phytotoxicity. The composition is useful in a protectant or eradicant fashion. The composition is applied by any of a variety of known techniques, either as the composition or as a formulation comprising the composition. For example, the compositions may be applied to the roots, seeds or foliage of plants for the control of various fungi, without damaging the commercial value of the plants. The composition is applied in the form of any of the generally used formulation types, for example, as solutions, dusts, wettable powders, flowable concentrates, or emulsifiable concentrates. These materials are conveniently applied in various known fashions.

The composition has been found to have significant fungicidal effect, particularly for agricultural use. The composition is particularly effective for use with agricultural crops and horticultural plants, or with wood, paint, leather or carpet backing.

In particular, the composition is effective in controlling a variety of undesirable fungi that infect useful plant crops. The composition may be used against a variety of Ascomycete and Basidiomycete fungi, including for example the following representative fungi species: barley leaf scald (*Rhynchosporium secalis*); spot blotch of barley (*Cochliobolus sativum*); barley Ramularia leaf spot (*Ramularia collo-cygni*); barley net blotch (*Pyrenophora teres*); barley powdery mildew (*Blumeria graminis* f. sp. *hordei*); wheat powdery mildew (*Blumeria graminis* f. sp. *tritici*); eye spot of wheat (*Pseudocercosporella herpotrichoides*); wheat brown rust (*Puccinia triticina*); stripe rust of wheat (*Puccinia striiformis*); leaf blotch of wheat (*Zymoseptoria tritici*); glume blotch of wheat (*Parastagonospora nodorum*); *Fusarium* head blight (FHB) in wheat (*Fusarium graminearum* and *Fusarium culmorum*); grey leaf spot of corn (*Cercospora zeae-maydis*); brown rust of corn (*Puccinia polysora*); *phaeosphaeria* leaf spot of corn (*Phaeosphaeria maydis*); leaf spot of sugar beets (*Cercospora beticola*); rice sheath blight (*Rhizoctonia solani*) and rice blast (*Pyricularia oryzae*). It will be understood by those in the art that the efficacy of the compositions for one or more of the foregoing fungi establishes the general utility of the compositions as fungicides.

The compositions have a broad range of efficacy as a fungicide. The exact amount of the composition to be applied is dependent not only on the relative amounts of the components, but also on the particular action desired, the fungal species to be controlled, and the stage of growth thereof, as well as the part of the plant or other product to be contacted with the composition. Thus, formulations containing the composition may not be equally effective at similar concentrations or against the same fungal species.

The compositions are effective in use with plants in a disease-inhibiting and phytologically acceptable amount. The term "disease-inhibiting and phytologically acceptable amount" refers to an amount of the composition that kills or inhibits the plant disease for which control is desired, but is not significantly toxic to the plant. The exact concentration of composition required varies with the fungal disease to be controlled, the type of formulation employed, the method of application, the particular plant species, climate conditions, and the like.

The present compositions can be applied to fungi or their locus by the use of conventional ground sprayers, granule applicators, and by other conventional means known to those skilled in the art.

The following examples are provided to further illustrate the disclosure. They are not meant to be construed as limiting the disclosure.

EXAMPLES

Treatments consisted of the compound of Formula I and fenpicoxamid either using individually or as a two-way mixture with the compound of Formula I. The compound of Formula I was applied with Agnique BP-420 (50% w/w at 0.3% v/v) at 75 and 150 g ai/ha and fenpicoxamid was applied with Agnique BP-420 (50% w/w at 0.3% v/v) at 75 and 100 g ai/ha. Commercial standards used in the studies were Fluxapyroxad (Imtrex), applied at 100 g ai/ha, and Metconazole+Fluxapyroxad (Librax), applied at 161 g ai/ha.

Field Assessment of *Puccinia recondita* (PUCCRT) in Wheat:

Fungicidal treatment containing the compound of Formula I and fenpicoxamid, either individually or as a two mixture, were assessed against brown rust of wheat (PUCCRT) in two separate field trials. In the first trial, fungicidal treatments were applied at B37-39 (protectant, approximately 0% infection at application) growth stage of wheat (TRZAW, MV Vanek variety) under natural infection of brown rust. The treatment was part of an experimental trial designed as a randomized complete block with four replications and a plot of approximately 2×3 m. Fungicidal treatments were applied at a water volume of 200 L/ha, using a backpack plot sprayer with a TEEJET QJ90-2XTT110 015 Nozzle.

In the second trial, fungicidal treatments containing the compound of Formula I and fenpicoxamid, either individually or as a two way mixture, were applied at B33 (curative, approximately 6.6% infection at application) growth stage of wheat (TRZAW, Miradoux variety) under natural infection of brown rust. The treatments were part of an experimental trial designed as a randomized complete block with four replications and a plot of approximately 2×3 m. Fungicidal treatments were applied at a water volume of 200 L/ha, using a backpack plot sprayer with a HARDI MD110-02 Nozzle.

Disease severity (percentage of visual diseased foliage on whole plot or leaves) in both field trials was assessed at 5 weeks after application and was recorded following EPPO PP1/26 guideline prescriptions. Area under the disease progress curve (AUDPC) was calculated for each plot in both trials using the sets of recorded severity data. Relative AUDPC (% control based on AUDPC) was calculated as percent of the nontreated control. Final results for the control of brown rust of wheat by the compound of Formula I, fenpicoxamid, and mixtures are reported as an average of the relative AUDPC calculated over both field trials. Statistical analysis was done according to ANOVA and Tukey's test (p=0.10). Results are given in Table 1.

Field Assessment of *Puccinia striiformis* (PUCCST) in Wheat:

Fungicidal treatments containing the compound of Formula I and fenpicoxamid, either individually or as a two way mixture, were assessed against yellow rust of wheat (PUCCST) in two separate field trials. In the first trial, fungicidal treatments were applied twice at B31-32 (early curative, 4% infection at application on L3) and B39 (16.3% infection at application on L3) growth stages of winter wheat (TRZAW, Fairplay variety) under naturally occurring infection with PUCCST. The treatments were part of an experimental trial designed as a randomized complete block with four replications and a plot of approximately 1×6 m. Treatments were applied at water volume of 200 L/ha, using a backpack plot sprayer (BKPCKENG, F110-015 Hardi (3) Flat fan nozzle) and pressurized at 200 kPa.

In the second trial, fungicidal treatments containing the compound of Formula I and fenpicoxamid, either individually or as a two way mixture, were applied twice at B32 (protectant, 0% infection on L3 at application) and B37 (early curative, 20% infection on L3 at application) growth stages of wheat (TRZAW, Torch variety) under naturally occurring infection with PUCCST. The treatment was part of an experimental trial designed as a randomized complete block with four replications and a plot of approximately 2×4 m. Treatments were applied at water volume of 200 L/ha, using a backpack precision plot sprayer (BKCKAIR, F110-03 Hypro (4) Flat fan nozzle) and pressurized at 210 kPa.

Disease severity (percentage of visual diseased foliage on whole plot or leaves) in both field trials was assessed at 4-7 weeks after application and was recorded following EPPO PP1/26 guideline prescriptions. Area under the disease progress curve (AUDPC) was calculated for each plot in both trials using the sets of recorded severity data. Relative AUDPC (% control based on AUDPC) was calculated as percent of the nontreated control. Final results for the control of yellow rust of wheat by the compound of Formula I, fenpicoxamid, and mixtures are reported as an average of the relative AUDPC calculated over both field trials. Statistical analysis was done according to ANOVA and Tukey's test (p=0.10). Results are given in Table 2.

Field Assessment of *Zymoseptoria Tritici* (SEPTTR) in Wheat:

Fungicidal treatments containing the compound of Formula I and fenpicoxamid, either individually or as a two way mixture, were assessed against leaf spot of wheat (SEPTTR) in three separate field trials. In the first trial, fungicidal treatments were applied at B37 (curative, 1.8% infection at application on L4) growth stage of winter wheat (TRZAW, Sy moisson variety) under naturally occurring infection with SEPTTR. The treatments were part of an experimental trial designed as a randomized complete block with four replications and a plot of approximately 2×4 m. Treatments were applied at water volume of 200 L/ha, using a backpack plot sprayer (BKPCKAIR, FLAT FAN nozzle) and pressurized at 250 kPa.

In the second trial, fungicidal treatments were applied twice at B32 (curative, 15% infection at application on L5) and B39 (16% infection at application on L4) growth stages of winter wheat (TRZAW, Riband variety) under naturally occurring infection with SEPTTR. The treatments were part of an experimental trial designed as a randomized complete block with four replications and a plot of approximately 1.5×2 m. Treatments were applied at water volume of 200 L/ha, using a backpack plot sprayer (BKPCKAIR, Flat fan nozzle) and pressurized at 180 kPa.

In the final trial, fungicidal treatments were applied twice at B32 (protective, 15% infection at application on L6) and B37 (12% infection at application on L5) growth stages of winter wheat (TRZAW, Smaragd variety) under naturally occurring infection with SEPTTR. The treatments were part of an experimental trial designed as a randomized complete block with four replications and a plot of approximately 2×3 m. Treatments were applied at water volume of 200 L/ha, using a backpack plot sprayer (BICYCAIR, FLATFANA nozzle) and pressurized at 220 kPa.

Disease severity (percentage of visual diseased foliage on whole plot or leaves) in both field trials was assessed at 7-9 weeks after application and was recorded following EPPO PP1/26 guideline prescriptions. Area under the disease progress curve (AUDPC) was calculated for each plot in both trials using the sets of recorded severity data. Relative AUDPC (% control based on AUDPC) was calculated as percent of the nontreated control. Final results for the control of leaf spot of wheat by the compound of Formula I, fenpicoxamid, and mixtures are reported as an average of the relative AUDPC calculated over all three field trials. Statistical analysis was done according to ANOVA and Tukey's test (p=0.10). Results are given in Table 3.

The test results from Tables 1-3 indicate: 1) On PUCCRT (Table 1), the mixture of the compound of Formula I at both 75 and 150 grams of active ingredient per hectare (g ai/ha) and fenpicoxamid (75 and 100 g ai/ha) gave levels of control numerically equivalent to the standard Imtrex. 2) On PUCCST (Table 2), according to ANOVA and Tukey's HSD (p=0.1), all treatments of the compound of Formula I mixed with fenpicoxamid showed numerically equivalent or superior levels of control as compared to Imtrex. 3) On SEPTTR (Table 3), the level of control obtained by the mixture of the compound of Formula I (75 g ai/ha) and fenpicoxamid (75 g ai/ha) provided equivalent control to the standards Librax and Imtrex.

TABLE 1

Efficacy of the Compound of Formula I, Fenpicoxamid and Commercial Standards Against PUCCRT[a] Based on AUDPC[b] Control Conducted over 2 Field Trials.

| Composition[c] | Rates (g ai/ha)[d] | PUCCRT % Control |
|---|---|---|
| Compound I + Fenpicoxamid | 150 + 75 | 93.4 |
| Compound I + Fenpicoxamid | 150 + 100 | 92.1 |
| Imtrex | 100 | 91.4 |
| Compound I + Fenpicoxamid | 75 + 100 | 89.9 |
| Compound I + Fenpicoxamid | 75 + 75 | 88.9 |

TABLE 1-continued

Efficacy of the Compound of Formula I,
Fenpicoxamid and Commercial Standards
Against PUCCRT[a] Based on AUDPC[b]
Control Conducted over 2 Field Trials.

| Composition[c] | Rates (g ai/ha)[d] | PUCCRT % Control |
|---|---|---|
| Compound I | 150 | 89.0 |
| Compound I | 75 | 79.7 |
| Fenpicoxamid | 100 | 74.5 |
| Fenpicoxamid | 75 | 63.5 |

[a]PUCCRT—Puccinia triticina—Brown Rust of Wheat
[b]% Control based on the Area Under the Disease Progression Curve (AUDPC)
[c]Composition of the compounds of Formula I and fenpicoxamid, both individually and in mixtures, with Agnique BP-420 (50% w/w at 0.3% v/v)
[d]g ai/ha—grams of active ingredient per hectare

TABLE 2

Efficacy of the Compound of Formula I,
Fenpicoxamid and Commercial Standards
Against PUCCST[a] Based on AUDPC[b]
Control Conducted over 2 Field Trials.

| Composition[c] | Rates (g ai/ha)[d] | PUCCST % Control |
|---|---|---|
| Compound I + Fenpicoxamid | 150 + 100 | 89.0 |
| Compound I + Fenpicoxamid | 150 + 75 | 88.5 |
| Compound I + Fenpicoxamid | 75 + 100 | 85.7 |
| Compound I | 150 | 85.5 |
| Compound I + Fenpicoxamid | 75 + 75 | 84.8 |
| Compound I | 75 | 82.7 |
| Imtrex | 100 | 75.9 |
| Fenpicoxamid | 100 | 60.5 |
| Fenpicoxamid | 75 | 56.5 |

[a]PUCCST—Puccinia striiformis—Yellow Rust of Wheat
[b]% Control based on the Area Under the Disease Progression Curve (AUDPC)
[c]Composition of the compounds of Formula I and fenpicoxamid, both individually and in mixtures, with Agnique BP-420 (50% w/w at 0.3% v/v)
[d]g ai/ha—grams of active ingredient per hectare

TABLE 3

Efficacy of the Compound of Formula I,
Fenpicoxamid, and Commercial Standards
Against SEPTTR[a] Based on AUDPC[b]
Control Conducted over 3 Field Trials.

| Composition[c] | Rates (g ai/ha)[d] | SEPTTR % Control |
|---|---|---|
| Librax | 161 | 82.6 |
| Compound I + Fenpicoxamid | 150 + 75 | 81.0 |
| Compound I + Fenpicoxamid | 75 + 75 | 79.8 |
| Imtrex | 100 | 78.4 |
| Compound I + Fenpicoxamid | 150 + 50 | 75.9 |
| Compound I + Fenpicoxamid | 75 + 50 | 72.5 |
| Compound I | 150 | 65.8 |
| Fenpicoxamid | 75 | 57.7 |
| Fenpicoxamid | 50 | 48.7 |
| Compound I | 75 | 48.2 |

[a]SEPTTR—Zymoseptoria trtitci—Leaf Blotch of Wheat
[b]% Control based on the Area Under the Disease Progression Curve (AUDPC)
[c]Composition of the compounds of Formula I and fenpicoxamid, both individually and in mixtures, with Agnique BP-420 (50% w/w at 0.3% v/v)
[d]g ai/ha—grams of active ingredient per hectare

What is claimed:

1. A method for the control of fungal diseases on wheat, the method including the step of: applying a fungicidally effective amount of a formulation comprising a compound of Formula I and fenpicoxamid to at least one of: a plant, an area adjacent to the plant, soil adapted to support growth of the plant, a root of the plant, foliage of the plant, and a seed adapted to produce the plant; wherein Formula I is:

2. The method according to claim 1, wherein the formulation further comprises at least one of an agriculturally acceptable adjuvant and a carrier.

3. The method according to claim 1, wherein the fungal diseases are selected from the group consisting of mildew (Blumeria graminis f. sp. tritici); eye spot of wheat (Pseudocercosporella herpotrichoides); wheat brown rust (Puccinia triticina); stripe rust of wheat (Puccinia striiformis); leaf blotch of wheat (Zynwseptoria tritici); glume blotch of wheat (Parastagonospora nodorum); and Fusarium head blight (FHB) in wheat (Fusarium graminearum and Fusarium culmorum).

4. The method according to claim 3, wherein the disease is wheat brown rust (Puccinia triticina).

5. The method according to claim 3, wherein the disease is stripe rust of wheat (Puccinia striiformis).

6. The method according to claim 3, wherein the disease is leaf blotch of wheat (Zymoseptoria tritici).

7. The method according to claim 1, wherein weight ratio of the compound of Formula I to fenpicoxamid is from about 10:1 to about 1:10.

8. The method according to claim 7, wherein the disease is wheat brown rust (Puccinia triticina).

9. The method according to claim 7, wherein weight ratio of the compound of Formula I to fenpicoxamid is from about 2:1 to about 1:2.

10. The method according to claim 7, wherein the disease is stripe rust of wheat (Puccinia striiformis).

11. The method according to claim 10, wherein weight ratio of the compound of Formula I to fenpicoxamid is from about 2:1 to about 1:2.

12. The method according to claim 7, wherein the disease is leaf blotch of wheat (Zymoseptoria tritici).

13. The method according to claim 12, wherein weight ratio of the compound of Formula I to fenpicoxamid is from about 2:1 to about 1:2.

* * * * *